United States Patent
Ice, Jr. et al.

(10) Patent No.: US 6,658,563 B1
(45) Date of Patent: Dec. 2, 2003

(54) VIRTUAL FLOPPY DISKETTE IMAGE WITHIN A PRIMARY PARTITION IN A HARD DISK DRIVE AND METHOD FOR BOOTING SYSTEM WITH VIRTUAL DISKETTE

(75) Inventors: Herbert Jackson Ice, Jr., Austin, TX (US); Robert Duane Johnson, Raleigh, NC (US); Kofi Kekessie, Durham, NC (US); David Rhoades, Apex, NC (US); Gary Anthony Vaiskauckas, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,729

(22) Filed: May 18, 2000

(51) Int. Cl.[7] .......................... G06F 15/177; G06F 1/24
(52) U.S. Cl. ............................ 713/2; 713/1; 713/100
(58) Field of Search ............................ 713/1, 2, 100; 711/173; 700/5

(56) References Cited

U.S. PATENT DOCUMENTS

| | | | |
|---|---|---|---|
| 5,142,680 A | * | 8/1992 | Ottman et al. ............... 717/176 |
| 5,758,165 A | * | 5/1998 | Shuff .......................... 717/176 |
| 5,764,903 A | | 6/1998 | Yu |
| 5,787,491 A | * | 7/1998 | Merkin et al. ............... 711/173 |
| 5,887,164 A | | 3/1999 | Gupta |
| 5,930,831 A | * | 7/1999 | Marsh et al. ................ 711/173 |
| 5,964,830 A | | 10/1999 | Durrett |
| 6,192,471 B1 | * | 2/2001 | Pearce et al. ................... 713/2 |
| 6,199,159 B1 | * | 3/2001 | Fish ............................... 713/2 |
| 6,304,965 B1 | * | 10/2001 | Rickey .......................... 713/2 |
| 6,430,663 B1 | * | 8/2002 | Ding .......................... 711/162 |
| 6,473,655 B1 | * | 10/2002 | Gould et al. .................... 700/5 |

FOREIGN PATENT DOCUMENTS

JP   404268626 A   *   9/1992

OTHER PUBLICATIONS

"Dynamic Validation of a Large Virtual Partition Space", IBM Technical Disclosure Bulletin, Dec. 1973, vol. No. 16, pp. 2104–2105.*

"Enhancing Applications Performance on Intel Paragon through Dynamic Memory Allocation", IEEE, 1994, pp. 232–239.*

* cited by examiner

Primary Examiner—Thomas M. Heckler
Assistant Examiner—Chun Cao
(74) Attorney, Agent, or Firm—Bracewell & Patterson LLP

(57) ABSTRACT

A data processing system and method are described for booting a computer system from a virtual floppy diskette. A native operating system is executed by the computer system which utilizes a native file system. A boot able floppy diskette image is stored on the hard drive. The image includes a second operating system which utilizes a second file system. A master boot record stored on the hard drive is modified to include a boot bit. The boot bit is set in response to a storage of the image. The computer system is then booted from the image in response to the boot bit being set. The native operating system and the native file system are unchanged during the booting of the computer system from the image.

21 Claims, 4 Drawing Sheets

Translation Table

| Floppy Sector | Harddrive Sector |
|---|---|
| A | 3 |
| B | 4 |
| C | 1 |
| D | 0 |
| . | . |
| . | . |
| . | . |

VIRTUAL FLOPPY DISKETTE IMAGE WITHIN A PRIMARY PARTITION IN A HARD DISK DRIVE AND METHOD FOR BOOTING SYSTEM WITH VIRTUAL DISKETTE

BACKGROUND OF THE INVENTION

1. Field of the Invention

The present invention relates in general to data processing systems and, in particular, to a data processing system and method including a hard disk drive having a primary partition. Still more particularly, the present invention relates to a data processing system and method including a hard disk drive for booting a virtual floppy diskette image from the primary partition of the hard drive.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a mother board or system planar to electrically connect these components together. Examples of such personal computer systems are IBM's PC 300 series, Aptiva series, and Intellistation series.

With personal computer systems, there are numerous low level devices which contain firmware that require updating after they have already been installed at a customer site. Examples of such firmware include FLASH BIOS, SCSI devices, IDE devices, RAID adapters, systems management adapters, etc. The current solution today is to execute these updates locally from floppy diskettes. This is a very laborious task because a customer may have many computer systems, each geographically separated by miles.

If the computer systems are coupled together in a network, a server computer system could manage the updates remotely with appropriate scheduling. However, this remote maintenance solution is difficult to accomplish. Each computer system coupled to a network could be executing different operating systems. Each computer system should be permitted to keep running its native operating system with minimal interruption to its availability for users during the updating of the computer's firmware.

In order to be able to update a client computer system remotely from a server, an update for each hardware type must be designed and coded. This requires a significant amount of designing, coding, and testing for each update for each possible operating system. For example, if six different hardware types need to be updated on a client computer system running six different operating systems, thirty-six updates must be designed, coded, and tested.

A personal computer system includes a hard disk drive. FIG. 1 depicts a disk drive 12 and a disk 10 in accordance with the prior art. Disk 10 illustrates physical characteristics of both floppy and hard disks. Disk 10 includes a number of concentric data cylinders such as cylinder 14. Cylinder 14 includes several data sectors, such as sectors 16 and 18. Sectors 16 and 18 are located on an upper side 20 of disk 10. Additional sectors may be located on a lower side 22 of disk 10. Sides 20 and 22 of disk 10 define a platter 24. A hard disk may contain several platters. Upper side 20 of disk 10 is accessed by a head 26 mounted on an arm 28 secured to drive 12. A given sector on disk 10 may be identified by specifying a head, a cylinder, and a sector within the cylinder.

In a personal computer system, the hard disk drive may be divided into separate partitions. A different partition is required for each operating system stored on the drive. A different file system may be defined by each partition. Often, however, the drive includes only one partition. Therefore, for a computer system having only one partition, only one operating system may exist on the drive.

A computer system may be booted from a floppy drive, the system's hard drive, or other drive such as a CD ROM drive. When the computer system is powered on, the system first determines whether there is a boot able floppy disk in the floppy drive. If such a boot able disk is inserted in the floppy drive, the computer system will boot from this floppy disk. If no such boot able disk is inserted, the system will then attempt to boot from the hard drive.

A master boot record (MBR) is included on the first sector of either the hard drive or bootable floppy disk within which is stored a partition table. The partition table describes the number of partitions for the disk as well as information about the size and location of each partition. The master boot record also includes a program that reads the primary partition which contains the operating system to be booted into RAM. The primary partition is the active partition, i.e. the partition which includes the operating system which will be booted.

Applications exist today which allow a file to be created which contains an image of a floppy diskette. The file may be stored on a hard disk drive. The file must not be compressed and should be sized equal to the storage size of the floppy diskette.

Therefore a need exists for a data processing system and method including a hard disk drive having a primary partition which includes a virtual boot able floppy image, where the floppy image may not be readable by the native operating system of the data processing system, and where the system's original file system is undisturbed.

SUMMARY OF THE INVENTION

A data processing system and method are described for booting a computer system from a virtual floppy diskette. A native operating system is executed by the computer system which utilizes a native file system. A bootable floppy diskette image is stored on the hard drive. The image is a second operating system which utilizes a second file system. A master boot record stored on the hard drive is modified to include a boot bit. The boot bit is set in response to a storage of the image. The computer system is then booted from the image in response to the boot bit being set. The native operating system and the native file system are unchanged during the booting of the computer system from the image.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
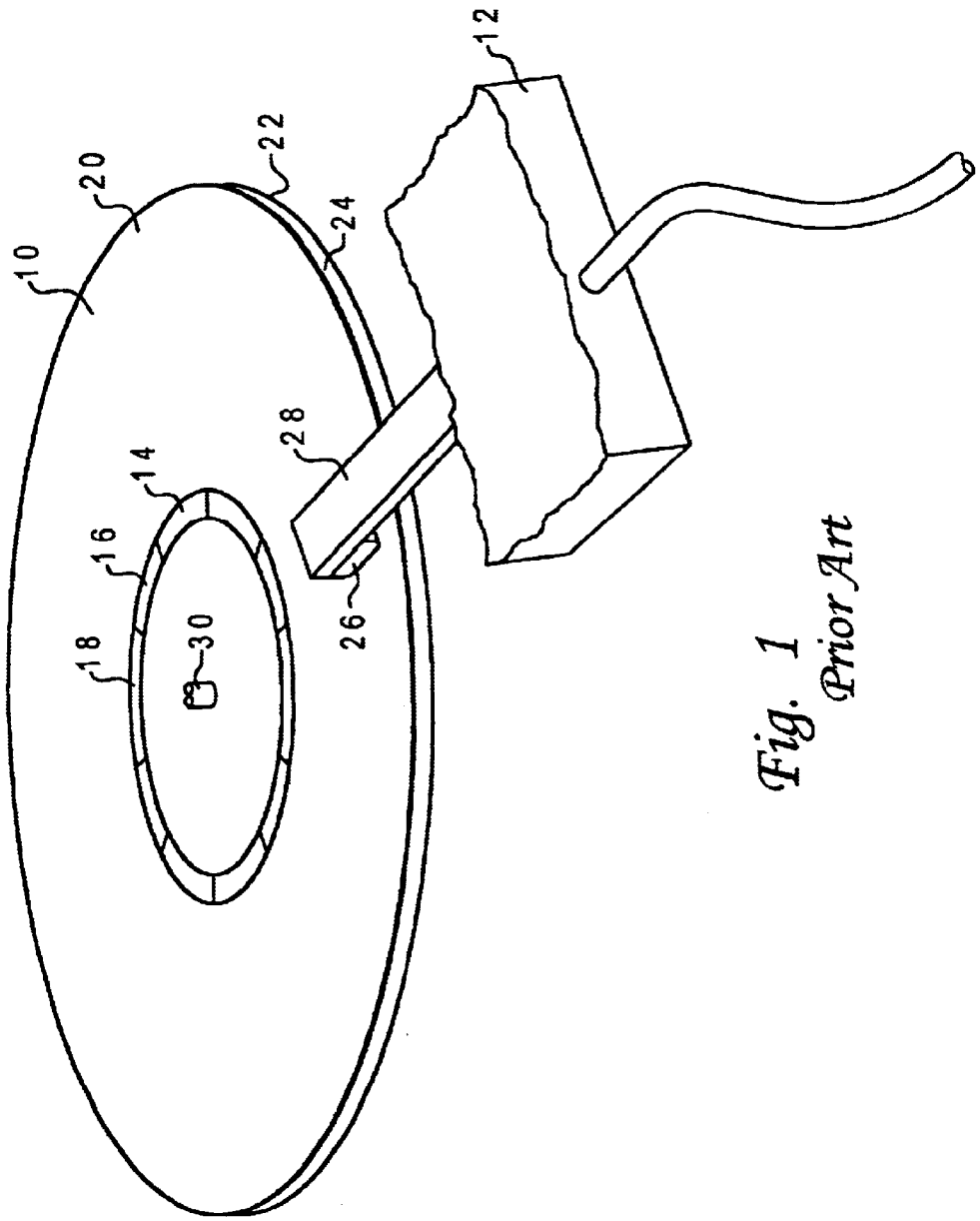
FIG. 1 depicts a disk drive 12 and a disk 10 in accordance with the prior art.

A preferred embodiment of the present invention and its advantages are better understood by referring to FIGS. 1–5 of the drawings, like numerals being used for like and corresponding parts of the accompanying drawings.

The present invention is a method and system for booting a client computer system from a virtual diskette. The virtual diskette is a floppy diskette image stored on a hard drive included within the client computer system. The client computer system is executing its native operating system which utilizes a native file system. The image is a second operating system which utilizes a second file system. The second operating system and file system are different from the native operating system and file system.

Once the computer system is booted from the virtual diskette, routines capable of being executed only by the second operating system may be executed.

A master boot record is stored on a hard disk drive included within the computer system. The master boot record includes a partition table describing all partitions and their file systems stored on the hard drive as well as including a bootstrap loading code for loading the initial routines which must be executed in order to boot the computer system with the native operating system. The present invention modifies the hard drive's master boot record by including a boot bit. When the boot bit is reset, the computer system will boot normally from its native operating system stored on the hard drive. When the boot bit is set, the computer system will boot from a virtual floppy diskette image which includes a different operating system.

The boot bit is set when a boot able floppy diskette image is stored on the hard drive. When the image is stored on the hard drive, new bootstrap loading code is stored in the hard drive's master boot record. This new bootstrap loading code will now execute to load the second operating system from the floppy diskette image. In addition, a relocator routine is also created which will translate floppy disk access requests into hard disk access requests. The computer system is then rebooted.

A translation table is created and stored on the hard drive when the boot able floppy image is stored on the hard drive. The translation table maintains an association between each floppy diskette sector where the data was designed to be stored and the hard disk sector where that data is actually stored. When disk requests are made to floppy diskette sectors, they are hooked by the relocator routine and translated using the translation table to the appropriate, associated hard disk sectors.

After the second operating system has been rebooted utilizing the floppy diskette image, routines such as maintenance routines may be executed using the second operating system. For example, routines written to be executed in a DOS environment to update firmware may be executed once the computer system is booted from a floppy diskette image including the DOS operating system.

After the routines have completed executing, the original master boot record including the original bootstrap loading code is restored. The computer system is then rebooted normally utilizing its native operating system.

Figure 2:
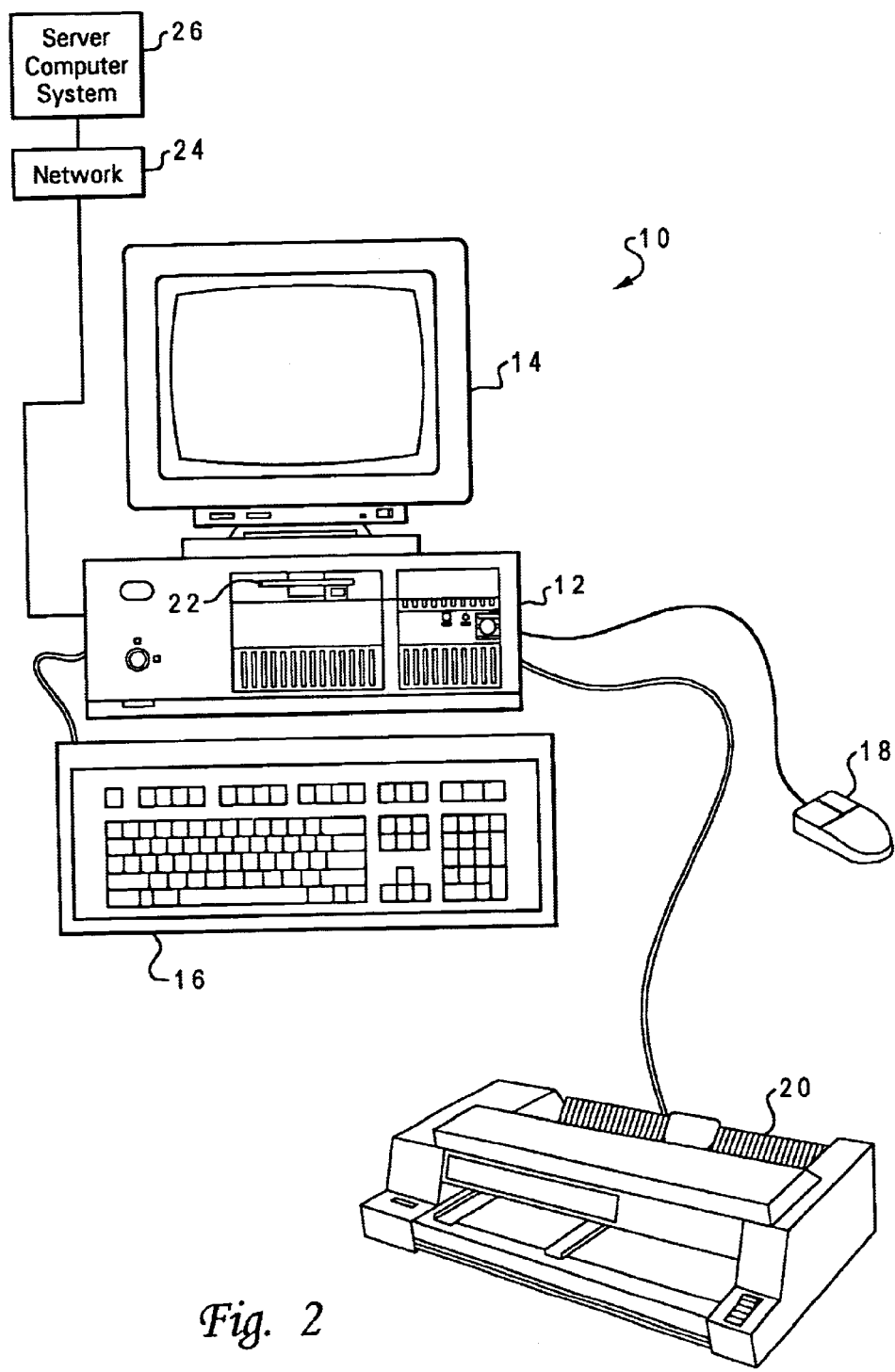
FIG. 2 illustrates a pictorial representation of a data processing system including a client computer system coupled to a server computer system utilizing a network in accordance with the method and system of the present invention.

FIG. 2 illustrates a pictorial representation of a data processing system including a client computer system 10 coupled to a server computer system 26 utilizing a network 24 in accordance with the method and system of the present invention. Client computer system 10 includes a computer 12, a monitor 14, a keyboard 16, a mouse 18, a printer or plotter 20, and a floppy drive 22. Client computer system 10 includes a hard drive (not shown) for storing data and for storing a virtual diskette as described below. Client computer system 10 may be implemented utilizing any commercially available computer system which has been suitably programmed and which has been modified as described below. Client computer system 10 is capable of receiving a variety of different types of inputs from a variety of different types of input devices. Keyboard 16 and mouse 18 are two such types of input devices.

Client computer system 10 may be coupled to a network, such as network 24. A server computer system 26 and other client computer systems are also coupled to network 24.

Network 24 may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figures 3, 4:
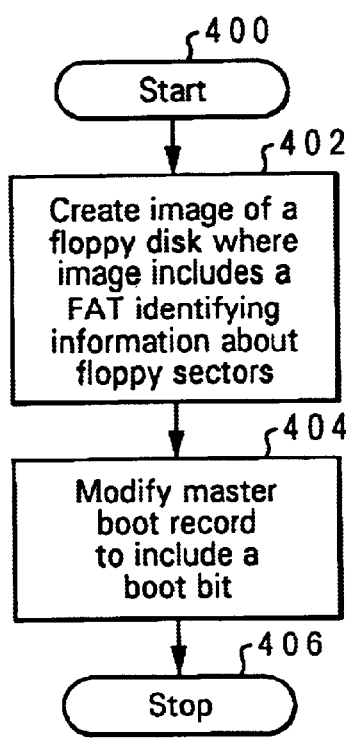
FIG. 3 depicts a pictorial representation of a translation table which maintains an association between floppy diskette sectors and hard drive sectors in accordance with the method and system of the present invention.
FIG. 4 illustrates a high level flow chart which illustrates the creation of a floppy diskette image and the modification of the master boot record to include a boot bit in accordance with the method and system of the present. invention.

FIG. 3 depicts a pictorial representation of a translation table which maintains an association between floppy diskette sectors and hard drive sectors in accordance with the method and system of the present invention. A translation table 300 is stored on client computer system's 10 hard drive. Translation table 300 is created when a floppy diskette image is stored on the hard drive. When the image is stored, for each floppy diskette sector, the data which is designed to be stored in a particular floppy diskette sector will instead be stored in a particular hard drive sector. Translation table 300 maintains an association between floppy diskette sectors 302 and hard drive sectors 304. For example, the data designed to be stored in floppy diskette sector "A" is actually stored on the hard drive in hard drive sector "3". Similarly, the data which designed to be stored in floppy diskette sector "B" is stored on the hard drive in hard drive sector "4", the data designed to be stored in floppy diskette sector "C" is stored on the hard drive in hard drive sector "1", and the data designed to be stored in floppy diskette sector "D" is stored on the hard drive in hard drive sector "0". Therefore, using translation table 300, the data designed to be stored on a floppy diskette is easily located on the hard drive.

FIG. 4 illustrates a high level flow chart which illustrates a creation of a floppy diskette image and the modification of the master boot record to include a boot bit in accordance with the method and system of the present invention. The process starts as depicted by block 400 and thereafter passes to block 402 which illustrates a creation of a floppy diskette image. This image will be a bootable image which preferably includes an operating system. Next, block 404 depicts the modification of the master boot record code stored on the hard drive to include a boot bit. The process then terminates as illustrated by block 406.

Figure 5:
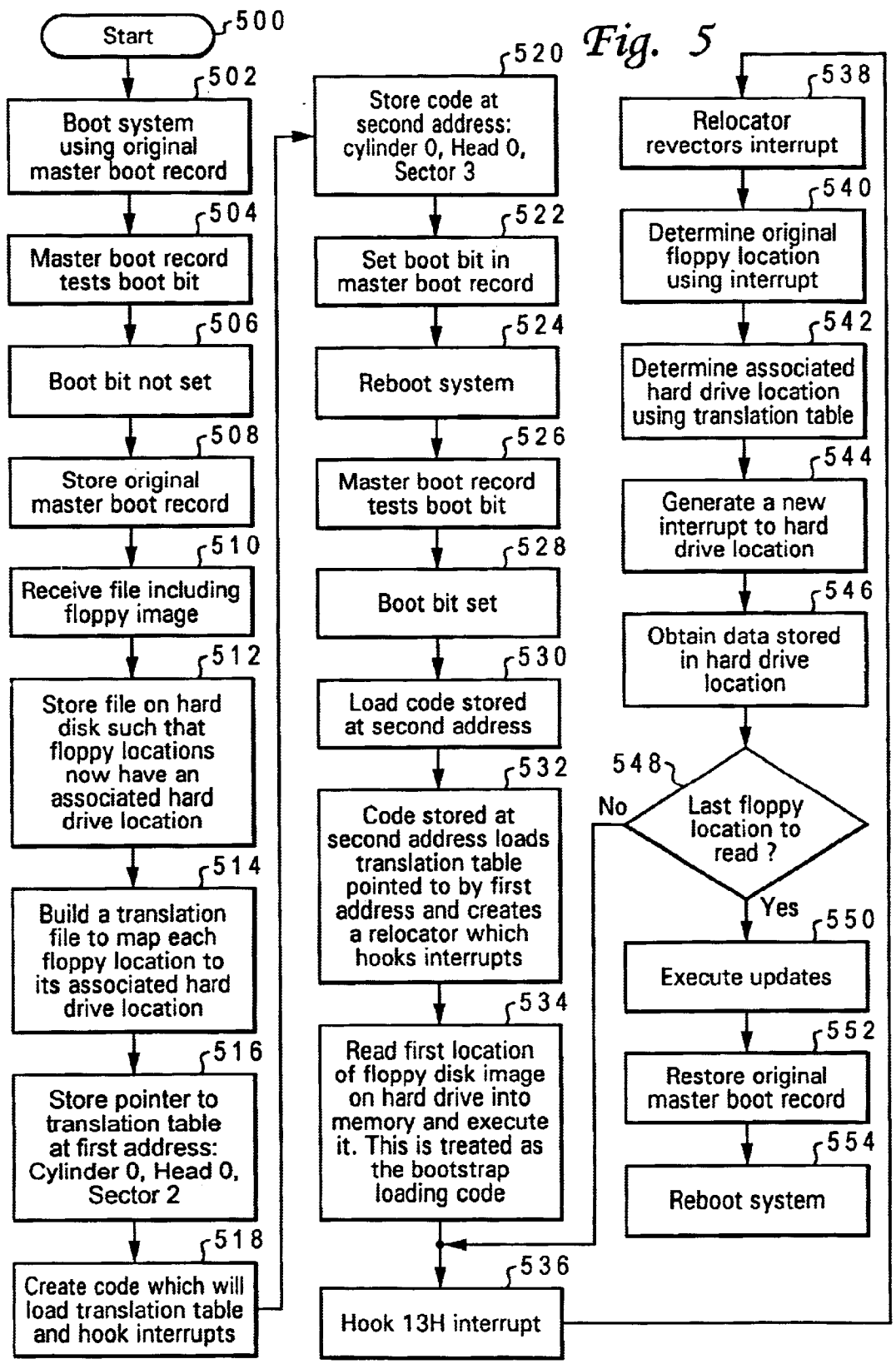
FIG. 5 depicts a high level flow chart which illustrates booting a client computer system from a virtual diskette, a floppy diskette image, stored on the client's hard drive in accordance with the method and system of the present invention.

FIG. 5 depicts a high level flow chart which illustrates booting a client computer system from a virtual diskette stored on the client's hard drive in accordance with the method and system of the present invention. The process starts as depicted by block 500 and thereafter passes to block 502 which illustrates booting client 10 using the original master boot record stored on the hard drive which includes a boot bit. Next, block 504 depicts the hard drive's master boot record testing the boot bit. Thereafter, block 506 illustrates the boot bit not being set. The boot bit is set only in response to a storage of a bootable floppy image on the client's hard drive. The process then passes to block 508 which depicts the storage of the original hard drive master boot record for recovery purposes. Next, block 510 illustrates the receipt of a bootable floppy image by client 10.

Thereafter, block 512 depicts the storage of the floppy image on the client's hard drive. Data originally designed to be stored in particular floppy diskette sectors is now stored in hard drive sectors. The process then passes to block 514 which illustrates building a translation table which will maintain an association between each floppy sector and the hard drive sector where the data is stored. Next, block 516 depicts storing a pointer to the translation table at a first logical address. The first logical address is: cylinder 0, head 0, sector 2. This address is the address of the hard drive sector located immediately after the hard drive sector where the master boot record is stored.

Next, block 518 illustrates creating relocator code which will load the translation table and hook interrupts. Thereafter, block 520 depicts the storage of the relocator code at a second logical address: cylinder 0, head 0, sector 3. This code is loaded by the hard drivers master boot record when the master boot record detects the boot bit being set. When the relocator code is loaded, it will load the translation table and create an intelligent interrupt hook. The process then passes to block 522 which illustrates setting the boot bit in the hard drive's master boot record. Thereafter, block 524 depicts rebooting client 10. Next, block 526 illustrates the hard drive's master boot record testing its boot bit. The process then passes to block 528 which depicts the hard drive's master boot record determining that the boot bit is set. Next, block 530 illustrates the hard drive's master boot record loading the code stored at the second logical address. Thereafter, block 532 depicts the code stored at the second address loading the translation table pointed to by the first address. The relocator code also creates an intelligent interrupt hook which hooks interrupts. In particular, the relocator hooks INT 13H type interrupts. An INT 13H interrupt is a disk services interrupt.

The process then passes to block 534 which illustrates the relocator code reading the first floppy disk sector location by translating this location using translation table 300 into its associated hard drive sector location. The data stored in this hard drive sector is read into memory and executed. This data is treated as the bootstrap loading code which will then request a read of the next floppy sector location. When an INT 13H call is generated in order to read this floppy location, block 536 depicts the relocator hooking the INT 13H interrupt. Next, block 538 illustrates the relocator code revectoring the interrupt to the associated hard disk location. The is accomplished, as depicted by block 540, by determining the original floppy sector included within the hooked INT 13H interrupt. Thereafter, block 542 depicts determining which hard drive sector is associated with this floppy diskette sector using translation table 300. The process then passes to block 544 which illustrates the generation of a new INT 13H interrupt to the associated hard drive location.

The process then passes to block 546 which depicts obtaining the data stored in the hard drive sector location. Thereafter, block 548 illustrates a determination of whether or not this was the last floppy sector to read. If a determination is made that this is not the last floppy sector to read, the process passes back to block 536. Referring again to block 548, if a determination is made that this is the last floppy sector to read, the process passes to block 550 which depicts executing any updates using the operating system just booted from the floppy image. Thereafter, block 552 illustrates restoring the original master boot record stored on the hard drive. Block 554, then, depicts rebooting client 10.

While a preferred embodiment has been particularly shown and described, it will be understood by those skilled in the art that various changes in form and detail may be made therein without departing from the spirit and scope of the present invention.

What is claimed is:

1. In a computer system having a hard drive and a master boot record, a method for booting said computer system from a virtual floppy diskette, said method comprising:
   modifying the master boot record of said computer system to include a boot bit;
   booting said computer system with a native operating system having an associated native file system during a standard boot operation when said boot bit is not set;
   storing an image of a bootable floppy diskette on said hard drive, said image including a second operating system with an associated second file system;
   automatically setting said boot bit in response to a storage of said image on said hard drive; and
   booting said computer system from said image when said boot bit is set, wherein said image acts as a virtual floppy diskette with boot capability similar to said bootable floppy diskette, and wherein said second operating system and associated second file system are executed in place of said native operating system and said native file system.

2. The method according to claim 1, wherein the step of storing a bootable floppy diskette image further comprises the step of storing a bootable floppy diskette image in a primary partition of said hard drive.

3. The method according to claim 2, further comprising the steps of:
   generating a plurality of floppy disk access requests to access said image during said step of booting said computer system from said image;
   translating each of said plurality of floppy disk access requests to one of a plurality of hard disk access requests; and
   executing said plurality of floppy disk access requests by accessing said hard drive utilizing said plurality of hard disk access requests.

4. The method according to claim 3, further comprising the step of establishing a translation table for maintaining an association between each of said plurality of floppy disk access requests and one of said hard disk access requests.

5. The method according to claim 4, further comprising the step of establishing a routine within said master boot record stored in said hard drive for reading and executing a first floppy diskette sector as a bootstrap loading code.

6. The method according to claim 5, further comprising the step of establishing a relocator routine within said master boot record stored in said hard drive for translating each of a plurality of floppy disk access requests to one of a plurality of hard disk access requests.

7. The method according to claim 6, further comprising the step of executing a routine utilizing said second operating system after said computer system has booted from said image.

8. The method according to claim 7, further comprising the steps of:
   resetting said boot bit in response to a completion of said execution of said routine; and
   booting said computer system from said native operating system in response to said boot bit being reset.

9. The method according to claim 1, further comprising the step of establishing a routine within said master boot record stored in said hard drive for reading and executing a first floppy diskette sector as a bootstrap loading code.

10. The method according to claim 9, further comprising the step of establishing a relocator routine within said master boot record stored in said hard drive for translating each of a plurality of floppy disk access requests to one of a plurality of hard disk access requests.

11. In a computer system having a CPU and a hard disk drive on which is stored a master boot record, a system for booting said computer system from a virtual floppy diskette, said system comprising:
   means for modifying the master boot record to include a boot bit;
   means for booting said computer system with a native operating system having an associated native file system during standard boot operation when said boot bit is not set;
   means for storing an image of a bootable floppy diskette image on said hard drive, said image including a second operating system with a second file system;
   means for setting said boot bit in response to a storage of said image; and
   means for booting said computer system from said image when said boot bit is set, wherein said image acts as a virtual floppy diskette with booth capability similar to said bootable floppy diskette, and wherein said second operating system and associated second file system are executed in place of said native operating system and said native file system.

12. The system according to claim 11, wherein said means for storing a bootable floppy diskette image further comprises means for storing a bootable floppy diskette image in a primary partition of said hard drive.

13. The system according to claim 12, further comprising:
   means for generating a plurality of floppy disk access requests to access said image during said step of booting said computer system from said image;
   means for translating each of said plurality of floppy disk access requests to one of a plurality of hard disk access requests; and
   means for executing said plurality of floppy disk access requests by accessing said hard drive utilizing said plurality of hard disk access requests.

14. The system according to claim 13, further comprising a translation table for maintaining an association between each of said plurality of floppy disk access requests and one of said hard disk access requests.

15. The system according to claim 14, further comprising means within said master boot record for reading and executing a first floppy diskette sector as a bootstrap loading code.

16. The system according to claim 15, further comprising a relocator routine within said master boot record for translating each of a plurality of floppy disk access requests to one of a plurality of hard disk access requests.

17. The system according to claim 16, further comprising means for utilizing said second operating system after said computer system has booted from said image.

18. The system according to claim 17, further comprising:
   means for resetting said boot bit in response to a completion of said execution of said routine; and
   means for booting said computer system from said native operating system in response to said boot bit being reset.

19. The system according to claim 11, further comprising means within said master boot record for reading and executing a first floppy diskette sector as a bootstrap loading code.

20. The system according to claim 19, further comprising a relocator routine within said master boot record for translating each of a plurality of floppy disk access requests to one of a plurality of hard disk access requests.

21. A computer system including a CPU, input/output (I/O) devices, and a hard disk drive for booting said computer system from a virtual floppy diskette, comprising:
   means for executing a native operating system which utilizes a native file system utilizing said computer system;
   means for storing a bootable floppy diskette image in a primary partition on said hard drive, said image including a second operating system which utilizes a second file system;
   means for modifying a master boot record stored on said hard drive to include a boot bit;
   means for setting said boot bit in response to a storage of said image;
   means for booting said computer system from said image in response to said boot bit being set, wherein said image acts as a virtual floppy diskette and wherein said native operating system and said native file system are unchanged during said booting from said image;
   means for generating a plurality of floppy disk access requests to access said image during said step of booting said computer system from said image;
   means for translating each of said plurality of floppy disk access requests to one of a plurality of hard disk access requests;
   means for executing said plurality of floppy disk access requests by accessing said hard drive utilizing said plurality of hard disk access requests;
   means for establishing a translation table for maintaining an association between each of said plurality of floppy disk access requests and one of said hard disk access requests;
   means for establishing a routine within said master boot record stored in said hard drive for reading and executing a first floppy diskette sector as a bootstrap loading code;

means for establishing a relocator routine within said master boot record stored in said hard drive for translating each of a plurality of floppy disk access requests to one of a plurality of hard disk access requests;

means for executing a routine utilizing said second operating system after said computer system has booted from said image;

means for resetting said boot bit in response to a completion of said execution of said routine; and means for booting said computer system from said native operating system in response to said boot bit being reset.

* * * * *